United States Patent [19]
Ramamurthy et al.

[11] Patent Number: 5,276,677
[45] Date of Patent: Jan. 4, 1994

[54] PREDICTIVE CONGESTION CONTROL OF HIGH-SPEED WIDE AREA NETWORKS

[75] Inventors: Gopalakrishnan Ramamurthy; Bhaskar Sengupta, both of Cranbury, N.J.

[73] Assignee: NEC USA, Inc., Princeton, N.J.

[21] Appl. No.: 905,287

[22] Filed: Jun. 26, 1992

[51] Int. Cl.⁵ .................................. H04L 12/56
[52] U.S. Cl. ........................... 370/60; 370/68.1
[58] Field of Search ........... 370/13, 58.2, 58.3, 370/60, 68.1, 84, 94.1

[56] References Cited

U.S. PATENT DOCUMENTS

| | | | |
|---|---|---|---|
| 5,014,265 | 5/1991 | Hahne et al. | 370/60 |
| 5,146,454 | 9/1992 | Courtois et al. | 370/60 |
| 5,193,151 | 3/1993 | Jain | 370/60 |

OTHER PUBLICATIONS

K. Ko, P. P. Miahara and S. K. Tripathi, "Interaction Among Virtual Circuits Using Predictive Congestion Control," Second Annual Workshop on Very High Speed Networks, Greenbelt, Maryland, Mar. 4-5, 1991, pp. 96-119.

*Primary Examiner*—Benedict V. Safourek
*Attorney, Agent, or Firm*—Arthur J. Torsiglieri

[57] ABSTRACT

To control congestion in packet switching networks, control of the traffic sent by a given station to each of the downstream nodes to which it is directly connected is effected by control of the traffic that the upstream nodes to which it is directly connected are permitted to send to it. In this regard, a predictive model is used to predict the cross traffic, one round trip delay in advance that the given station can expect. The parameters for the predictive model are obtained by measurements in real time and by the use of moving averages. Using the predicted cross traffic, the amount of controlled traffic that the proximate downstream nodes can accommodate from the given node, and the correct state of the given node, the state of the given node one round trip delay into the future is predicted. This prediction is used to schedule the amount of traffic to be sent by each of its proximate upstream nodes.

6 Claims, 2 Drawing Sheets

PREDICTIVE CONGESTION CONTROL OF HIGH-SPEED WIDE AREA NETWORKS

INTRODUCTION

This invention relates to packet switching networks and more particularly to such network that includes provision for congestion control. Congestion control involves limiting the rate at which traffic is entered into a network to a rate at which the network can transport the traffic to its intended destination without inordinate delay.

BACKGROUND OF THE INVENTION

Advances in high-speed packet switching and fiber optic technology have opened the possibility of providing switching and transmission capacity from several 100 Mbits/second to several Gbits/second in a packet switched environment. However, the processing power and the ability to provide large amount of high speed buffers may not keep pace with the advances in transmission speeds. As a consequence, the dominant source of packet or cell loss in such networks would be due to buffer overflow. In low speed networks, flow and congestion control have been based on reactive mechanisms. These include the logical link controls, and end-to-end flow controls based on windows or credits. Such reactive or feedback controls essentially throttle the upstream node or the source, as the case may be, when the network experiences congestion. Such controls have been effective because the queueing delays in low speed networks have been much larger than the propagation delays. As a result, the sources were able to react to overloads before the state of the system changed significantly. In contrast, in high speed networks, where propagation delay dominates, reactive feedback controls tend to be too slow to be effective. The speed with which congestion sets in or dissipates is proportional to the speed of the link. Because the state of individual nodes can change rapidly, feedback information will be out of date if the time to propagate the information is longer than the node time constants.

A common flow or congestion control scheme in low speed networks has been the use of end-to-end flow control based on windows. For example, for each connection or virtual circuit (VC), the maximum number of unacknowledged packets is limited to a window of W packets. In order to ensure very low packet loss due to too many VCs becoming active at the same time, one has to allocate a window's worth of buffer for every VC at every node on the VC's path. In high speed wide area networks, the number of VCs can be very large, and the required window to obtain high throughput is also large because of the large bandwidth delay product, and this can translate to an unrealistic number of buffers in the network. Further, a combination of large number of VCs, each with a large window, can lead to severe congestion when too many VCs become active at the same time. An alternative is to use an adaptive end-to-end control, where the window size is modulated based on the state of the nodes on the VC's path. However, the effectiveness of such a scheme diminishes as the bandwidth delay product increases.

Unlike reactive controls that allow congestion to develop in the first place and then react to it, congestion avoidance strategies try to avoid congestion in the first place, through conservative admission policies. Such admission controls result in admission delays which are of the order of queueing delays (which is low at high speeds) and can be easily tolerated by many applications, if a low cell loss can be guaranteed. Cell loss on the other hand leads to retransmission, and the resulting delay can be of the order of propagation delay. Such congestion avoidance strategies are generally based on controlling the rate at which cells are admitted into the network. In most static rate control schemes, an estimate of the average available bandwidth (for the class of traffic being controlled) is made. For example, if the average bandwidth usage by higher priority services, such as voice and video, is $\bar{\lambda}_X$ (this is known from the call admission control), and if the link bandwidth is $\lambda_L$, then the average available excess capacity $\bar{\lambda}_C = \lambda_L - \bar{\lambda}_X$. The static rate controls ensure that the combined arrival rate of the rate controlled low priority class is limited to some value $r\bar{\lambda}_C$ ($0 < r < 1$). The problem with this approach is that in the short run, the excess capacity can momentarily reduce to zero and can remain at that level for a time that is much larger than the amount of buffers available at the congested node. This would lead to large cell losses, especially if the factor r is large. For the cell loss rate to be low, r has to be much smaller than 1, leading to under-utilization of the link. Several end-to-end schemes have been proposed which attempt to detect congestion and regulate the sources accordingly. End-to-end adaptive schemes however can be effective only when the round trip propagation delays are small compared to the queue time constants. It can be shown that the adaptive end-to-end rate control scheme can at best perform only as well as an optimum static rate control scheme. The disadvantage of the static rate control scheme is that if low cell loss is required, then the scheme results in low utilization. Any attempt to increase the utilization results in an increase in cell loss. However, end-to-end control schemes may be effective in high speed networks with small round trip delays such MANs and LANs.

Feedback flow control can be classified as static or adaptive, and it can be based on an end-to-end window mechanism or can be rate based. In the static window mechanism, the number of unacknowledged messages in the network is limited by the window size. In adaptive window control schemes, the congested nodes send congestion signals to the source and the source in turn responds by modifying its window size. In one known system, the optimum end-to-end window is measured by the round trip response time of packets and the window is adjusted dynamically. In another known system, a feed forward rate control at the access node operates under an end-to-end window control that stabilizes the open loop rate control. In the event of congestion, the end-to-end window control can be reduced by the congested nodes which in turn quenches the source. The source responds by reducing its rate. In another system, a packet pair probing technique in conjunction with round robin scheduling by virtual circuits at each node is used to determine the level of congestion in the network, and an appropriate control algorithm is used to control the source rate.

In another study, the performance of a threshold based feedback control policy in a high-speed network with significant propagation delay has been investigated. The principal difficulty with high-speed wire area networks is the long round trip delay, which makes end-to-end controls ineffective. A knowledge of the state of the nodes on the VC's path cannot be exploited because of the large round trip propagation delays. Since the timeliness of the state information is determined by the propagation delay and the rate at which the state of the queues are changing, myopic controls are more meaningful. For example, feedback controls between adjacent nodes that are not separated by large delays will be more effective than feedback between edge nodes.

SUMMARY OF THE INVENTION

In the light of the above consideration, the present invention uses hop-by-hop flow control, based on a policy that predicts the state of a given node in advance by at least one round trip delay. In particular, a predictive model is used to predict the cross traffic one round trip delay in advance. The parameters for the predictive model are obtained by measurements in real time and by the use of moving averages. Using the predicted cross traffic, the amount of controlled traffic that the node downstream of the given node can accommodate from the given node, and the current state of the given node, the state of the given node one round trip delay into the future is predicted. Knowledge of the future state of the given node is used to adjust the amount of controlled traffic at the node upstream of the given node that will be sent down to the given node. As a consequence, the given node generally receives only as much traffic as it can safely pass, so that congestion at such node is well controlled.

As the terms are used herein, "controlled traffic" is traffic, such as data, that can tolerate appreciable delay and so is readily controlled, as contrasted with real time traffic, such as voice and video, known as "cross traffic," that cannot tolerate significant delay, and so needs to have priority in transmission and is not readily controlled.

DETAILED DESCRIPTION OF THE INVENTION

Figure 1:
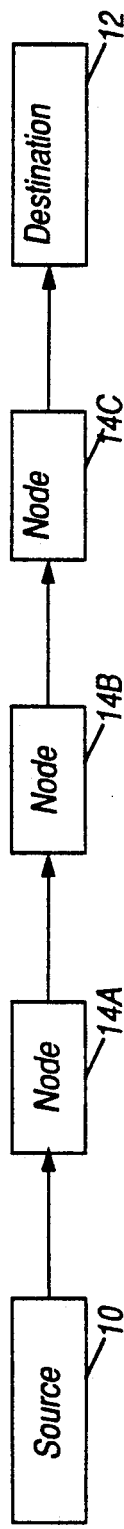
FIG. 1 shows a model of a tandem network for high speed packet switching transmission.

With reference now to the drawing, FIG. 1 shows a transmission network for interconnecting a transmitter 10 of signal information, or traffic, in packet form representative of voice, video and data signals and a receiver 12 of the signal information, the transmitter and receiver being interconnected by a suitable broadband transmission channel that includes a plurality of intermediate tandem nodes 14A, 14B, 14C, spaced along the channel at each of which traffic may be abstracted from or added to the channel. Nodes 14A and 14C will be described as upstream and downstream, respectively, of node 14B. Typically, there will be large number of nodes in the network.

It will be assumed that at each node, including those corresponding to the transmitter and the receiver, controlled data traffic has to compete with video and voice cross traffic for access so that buffers (not shown) are included at each node where input traffic in packet form can be stored temporarily in queues while awaiting transfer to the transmission channel for transmission therealong its assigned destination.

In accordance with the preferred form of the invention, the cross traffic at each node is modelled by a first order autoregressive function with its parameters estimated in real time, and this cross traffic model is used to predict the evolution of the queues of cross and controlled traffic at each node.

Basically, at the beginning of each time frame set for the system, each node in the network notes its own state, given by the content of its buffers and the amount of cross traffic it received during the last frame. For each frame it also receives information from its downstream neighbor; for example, node 14B will receive information from node 14C about the maximum amount of controlled traffic that node 14B can safely send it during the next frame, in light of the amount and type of traffic that node 14C expects to originate of its own. Node 14B then makes a prediction as to what will be the content of its buffers in the next three frames in the light of the amount of cross traffic it expects to receive and to transmit timely to node 14C. Based on the above information, node 14B tells it upstream neighbor, node 14A, the maximum amount of controlled traffic that node 14A can send to node 14B. The decision on the amount of traffic node 14A will be permitted to send is based on a tradeoff between getting high throughput and avoiding buffer overflow at node 14B. If the amount of traffic sent by node 14A is unnecessarily low, throughput may be unnecessarily low although the probability of buffer overflow at node 14B will be low. Alternatively, if to insure maximum throughput, node 14A sends all its traffic on to node 14B, the probability of buffer overflow at node 14B may be increased intolerably.

It is characteristic of the described system that it uses only information exchanged between adjacent nodes, a factor that make for prompt adjustment of traffic pattern changes. Additionally, it is receiver initiated, the prediction of the receiving node as to the amount of traffic it can accept, controls how much traffic it is sent. This makes it easy for a single downstream node connected to a plurality of upstream nodes to allocate the amount of traffic that it is willing to receive from each upstream node to assure that it is fully utilizing its buffer capacity with little risk of overflowing its capacity.

There follows a more formal description of the model.

Consider a tandem connection of $K+2$ nodes where node 0 is the source node, 1 to K the intermediate nodes, and node $K+1$ the destination of the controlled traffic. We refer to such a network as a K node network. We assume that node 0 has an infinite backlog of controlled traffic. At intermediate nodes 1 through K, we have also cross traffic, which has priority for service over the controlled traffic. The number of buffers at each node is finite and is shared by both traffic types. Time is divided into frames; the $n^{th}$ frame begins at time $t_n$ for $n=1,2,\ldots$ Let the propagation delay be $T_p$ between any two adjacent nodes. We assume that each intermediate node measures the number of cross traffic cells that arrive over successive non-overlapping intervals of length $T_M$. We refer to these intervals as measurement intervals. For the purpose of the discussion to follow, we assume that $T_M = T_p = t_{n+1} - t_n$. Later, we will relax this assumption.

Let us define the following quantities:

$X^j(n)$—Amount of cross traffic received by node j during frame n $D^j(n)$—Amount of cross traffic transmitted by node j during frame n $V^j(n)$—Maximum amount of controlled traffic that node j is allowed to transmit to node j+1 during frame n.

$I^j(n)$—Actual amount of controlled traffic transmitted by node j to mode j+1 during frame n $U^j(n)$—Amount of cross traffic queued at node j, at time $t_n$.

$W^j(n)$—Amount of controlled traffic queued at node j, at time $t_n$.

$B^j(n)$—Total traffic queued at node j, at time $t_n$ ($U^j(n) + W^j(n)$).

$C_{max}{}^j$—Maximum amount of traffic that node j can transmit in one frame. This is also the link capacity.

$B_{max}$—Buffer capacity at each node.

At time $t_{n-1}$, node j receives the decision $V^j(n-1)$ from node j+1. This is the maximum amount of controlled traffic that node j is allowed to transmit to node j+1 in frame n−1. At time $t_{n-1}$, node j also knows the cross traffic that it has received during frame n−2, which is $X^j(n-2)$. Assuming that we know all the quantities listed above, we now describe the dynamics of the system. For n=1,2,3, ... we make the following assumptions.

$$I^0(n) = V^0(n). \quad (1)$$

$$V^{K+1}(n) = \infty. \quad (2)$$

Here (1) implies that the source node (node 0) has an infinite backlog of controlled traffic and (2) implies that the destination absorbs all controlled traffic. Before writing down the equations, let us define the two additional items:

$$\bar{U}^j(n+1) = U^j(n) + X^j(n) - D^j(n). \quad (3)$$

$$\bar{W}^j(n+1) = W^j(n) + I^{j-1}(n-1) - I^j(n). \quad (4)$$

In (3), $\bar{U}^j(n+1)$ refers to the amount of cross traffic queued at node j at time $t_{n+1}$ under the additional assumption that there was no buffer overflow in frame n. In (4), $\bar{W}^j(n+1)$ refers to the amount of controlled traffic queued at node j at time $t_{n+1}$ under the additional assumption that there was no buffer overflow in frame n. Clearly, the assumption that there was no buffer overflow in frame n is correct if $\bar{U}^j(n+1) + \bar{W}^j(n+1) \leq B_{max}$. From this, we have $$\left. \begin{array}{l} U^j(n+1) = \bar{U}^j(n+1) \\ W^j(n+1) = \bar{W}^j(n+1) \end{array} \right\} \text{if } \bar{U}^j(n+1) + \bar{W}^j(n+1) \leq B_{max}. \quad (5)$$

We now discuss the case when a buffer overflow occurs, i.e., $\bar{U}^j(n+1) + \bar{W}^j(n+1) > B_{max}$. Since the cross traffic as well as the controlled traffic compete for the same buffer space, it seems reasonable to assume that their losses are proportional to the amount of traffic received from them during frame n. Thus, the fraction p of the total amount of overflow, attributed to cross traffic is $$p = \frac{X^j(n)}{X^j(n) + I^{j-1}(n-1)}, \quad (6)$$

and the fraction attributed to the controlled traffic is 1−p. From these statements, we have $$U^j(n+1) = \bar{U}^j(n+1) - p[\bar{U}^j(n+1) + \bar{W}^j(n+1) - B_{max}].$$

$$W^j(n+1) = \bar{W}^j(n+1) - (1-p)[\bar{U}^j(n+1) + \bar{W}^j(n+1) - B_{max}] \quad (7)$$

if $\bar{U}^j(n+1) + \bar{W}^j(n+1) > B_{max}$. Since the cross traffic has priority of service over the controlled traffic, the amount of cross traffic served by node j in frame n is $$D^j(n) = \min\{C_{max}{}^j, U^j(n) + X^j(n)\}. \quad (8)$$

Similarly, the amount of controlled traffic transmitted by node j during frame n is $$I^j(n) = \min\{C_{max}{}^j - D^j(n), W^j(n) + I^{j-1}(n-1), V^j(n)\}. \quad (9)$$

The first term in the braces is the available capacity during frame n after serving the high priority (cross) traffic. The second is the total buffer content due to controlled traffic and the third is the maximum amount of controlled traffic that node j is allowed to send during frame n.

In (1)–(9) above, we have shown how the quantities of interest are related to one another. In other words, if all the quantities were known, they would satisfy the equations (1)–(9). However, in the real problem, not all quantities are known. In fact, there are five that we need to study.

1. What is an adequate model of $X^j(n)$ for n=1,2, ... and j=1, ..., K+1? This will be the model for the cross traffic.
2. For the model of item 1, how does one estimate the parameters? This is the estimation problem.
3. What is a good way to determine the decision variable $V^j(n)$? This is the control problem.
4. What is a reasonable way to predict the buffer content three frames from now? This is the prediction problem.
5. How is the mechanism to be modified if $T_M \neq T_p$?

We address each of these issues in turn.

MODEL FOR CROSS TRAFFIC

The cross traffic is intended to model delay sensitive traffic and for this reason, it receives high priority. It is well known that delay sensitive traffic like video is correlated. To capture this, we propose a first order autoregressive process to model the cross traffic. Thus, we have $$X^j(n) = a_j X^j(n-1) + Y^j(n-1) \quad (10)$$

where $Y^j(n-1)$ is a sequence of non-negative and independent random variables. Here $a_j$ is the correlation coefficient at lag 1. It is well known that for this process, the correlation coefficient at lag k is given by $(a_j)^k$. Hereinafter, the term "first order autoregressive process model for cross traffic" will be used to define the foregoing process.

THE ESTIMATION PROBLEM

Since the model of (10) is used in the prediction process (to follow in the subsection), the parameters of the model are not known a priori. The estimation problem essentially takes a moving window of J frames. At time $t_n$, we estimate the mean of $X^j(n)$ by $$\hat{\mu}_j(n) = \frac{1}{J} \sum_{i=n-J}^{n-1} X^j(i). \tag{11}$$

We estimate the variance of $X^j(n)$ by $$\hat{\sigma}_j^2(n) = \frac{1}{J} \sum_{i=n-J}^{n-1} \{X^j(i)\}^2 - \{\hat{\mu}_j(n)\}^2.$$

Finally, the estimated correlation coefficient at lag 1 given by $$\hat{a}_j(n) = \left[ \frac{1}{J} \sum_{i=n-J}^{n-1} X^j(i)X^j(i-1) - \{\hat{\mu}_j(n)\}^2 \right] \{\hat{\sigma}_j^2(n)\}^{-1}. \tag{12}$$

By taking expectations of (10), we can find the estimate of the mean of $Y^j(n-1)$ as $$\hat{Y}^j(n-1) = \hat{\mu}_j(n)(1-\hat{a}_j(n)). \tag{13}$$

Hereinafter parameters for use in the first order autoregressive process model for cross traffic arrived at by the preceding estimation process shall be described as the estimated parameters.

THE CONTROL PROBLEM

At time $t_{n-1}$, node j knows the values of $X^j(n-2)$, $V^{j-1}(n-3)$, $D^j(n-2)$, $V^j(n-2)$, $V^j(n-1)$, $U^j(n-1)$ and $W^j(n-1)$. At this time, node j is required to find $V^{j-1}(n)$. This is the maximum amount of controlled traffic that node $j-1$ will be allowed to send to node j in frame n. This is the decision variable and we provide a P-Rule in which the criterion is to predict the total buffer occupancy $(U^j(n+2)+W^j(n+2))$ at node j at time $n+2$. This quantity is a function of the decision variable $V^{j-1}(n)$. The P-Rule is to find the smallest value of $V^{j-1}(n) \geq 0$, satisfying $\hat{B}^j(n+2) \geq PB_{max}$ for some $0 < P < 1$. Clearly, the idea is to target the predicted value of the buffer occupancy three frames from now to a value which is as close as possible to a certain fraction of the total available buffer. The parameter P tunes the control mechanism. If P is chosen to be very large, one can expect large buffer overflows and if it is chosen to be too small, the throughput will be small.

THE PREDICTION PROBLEM

The idea behind the prediction problem is to use the system dynamics described above. In using the system dynamics, we need to make the following three assumptions:

I. Not all the quantities above are known at time $t_{n-1}$. To circumvent this, we replace the unknown quantities by their estimates as discussed above.
II. We assume that the actual amount of controlled traffic transmitted by node $j-1$ in any frame $(V^{j-1}(.))$ is exactly equal to the maximum value allowed for that frame $(V^{j-1}(.))$.
III. The system dynamics contain some non-linear operations since the buffer content cannot fall below 0 and cannot exceed $B_{max}$. So, it is hard to take expectations of non-linear functions without having a complete knowledge of the distribution. To get around this difficulty, we ignore the non-linear effects in the prediction problem.

Item III above has two implications:

1. The prediction problem becomes easy to implement as we do not have to keep track of the distributions of various quantities.
2. The assumption of linearity introduces bias in the calculations.

However, the bias is likely to be very small because both buffer overflow and empty buffers should be unlikely events for a well designed system. Our fundamental goal in this problem is to achieve low losses and high throughput. The assumption of infinite backlog in the source node implies that a reasonable control scheme should avoid an empty buffer with high probability. Thus, the bias in the prediction problem is quite small indeed.

We now describe the three cycles of calculations. Note that the circumflex ($\wedge$) is used throughout the following to mean the corresponding predicted or estimated value.

CYCLE 1

At time $t_{n-1}$, node j carries out the following calculations for predicting the results at time $t_n$.

$$\hat{X}^j(n-1) = \hat{a}_j(n-1)X^j(n-2) + \hat{Y}^j(n-2) \quad \text{from (10-13)}$$
$$\hat{D}^j(n-1) = \min\{C^j_{max}, U^j(n-1) + \hat{X}^j(n-1)\} \quad \text{from (8)}$$
$$\hat{U}^j(n) = U^j(n-1) + \hat{X}^j(n-1) - \hat{D}^j(n-1) \quad \text{from (3)}$$
$$\hat{V}^{j-1}(n-2) = V^{j-1}(n-2) \quad \text{assumption II (14)}$$
$$\hat{P}(n-1) = \min\{C^j_{max} - \hat{D}^j(n-1), \quad \text{from (9)}$$
$$\hat{W}^j(n) = W^j(n-1) + \hat{V}^{j-1}(n-2) - \hat{P}(n-1) \quad \text{from (4)}$$

Note that in (14) we are assuming that the actual amount of controlled traffic transmitted $V^{j-1}(n-2)$ by node $j-1$, to node j in frame $n-2$ is exactly equal to the maximum allowed value $V^{j-1}(n-2)$. This is the most obvious prediction for $V^{j-1}(n-2)$ at time $t_{n-1}$.

CYCLE 2

At time $t_{n-1}$, node j carries out the following calculations to predict the results at time $t_{n+1}$.

$$\hat{Y}^j(n-1) = \hat{Y}^j(n-2) \tag{15}$$
$$\hat{X}^j(n) = \hat{a}_j(n-1)\hat{X}^j(n-1) + \hat{Y}^j(n-1) \quad \text{from (10)}$$
$$\hat{D}^j(n) = \min(C^j_{max}, \hat{U}^j(n) + \hat{X}^j(n)) \quad \text{from (8)}$$
$$\hat{U}^j(n+1) = \hat{U}^j(n) + \hat{X}^j(n) - \hat{D}^j(n) \quad \text{from (3)}$$
$$\hat{V}^{j-1}(n-1) = V^{j-1}(n-1) \quad \text{assumption II}$$
$$\hat{V}^j(n) = V^j(n-1) \tag{16}$$

$$\hat{P}(n) = \min\{C^j_{max} - \hat{D}^j(n), \hat{W}^j(n) + \hat{V}^{j-1}(n-1), \hat{V}^j(n)\} \quad \text{from (9)}$$

$$\hat{W}^j(n+1) = \hat{W}^j(n) + \hat{V}^{j-1}(n-1) - \hat{P}(n) \quad \text{from (4)}$$

Note that in (15), the estimate of $Y^j(n-1)$ is being set to the previous estimate. This is reasonable, since there is no additional information available to update this estimate. Similarly, in (16), the prediction of the maximum amount of controlled traffic $V^j(n)$ that node j can send to $j+1$ in frame n is simply set equal to the previous known value as there is no additional information available to make a better prediction.

CYCLE 3

At time $t_{n-1}$, node j carries out the following calculations to predict the results at time $t_{n+2}$.

$$\hat{Y}^j(n) = \hat{Y}^j(n-1)$$
$$\hat{X}^j(n+1) = \hat{a}_j(n)\hat{X}^j(n) + \hat{Y}^j(n) \quad \text{from (10)}$$
$$\hat{D}^j(n+1) = \min(C^j_{max}, \hat{U}^j(n+1) + \hat{X}^j(n+1)) \quad \text{from (8)}$$

-continued $$\hat{U}^j(n + 2) = \hat{U}^j(n + 1) + \hat{X}^j(n + 1) - \hat{D}^j(n + 1) \quad \text{from (3)}$$

$$\hat{V}^j(n + 1) = \hat{V}^j(n)$$
$$V^{j-1}(n) = PB_{max} - \hat{U}^j(n + 2) - \hat{W}^j(n + 1) + \min(C^j_{max} - \hat{D}^j(n + 1), \hat{V}^j(n + 1))$$

$$V^{j-1}(n) = \begin{cases} 0 & \text{if } \hat{U}^j(n+2) - PB_{max} \geq 0 \\ V^{j-1}(n) & \text{otherwise} \end{cases} \quad (17)$$

While the calculations in cycle 3 follow the usual pattern, Eq. (17) does not. We can prove that this choice of $V^{j-1}(n)$ actually satisfies the P-Rule specified above.

MEASUREMENT INTERVAL AND UPDATE INTERVALS

In the above model, we have assumed that the measurement interval $T_M = T_p$, the one way propagation delay. The measurement interval is determined by the rate at which the cross traffic rate changes. One unit of time for the cross traffic model is the measurement interval. The measurement interval is chosen such that in the interval $T_M$ the cross traffic rate does not change significantly.

Consider the case when the measurement interval $T_M$ is less than the propagation delay $T_p$, say $T_p = mT_M$ (m > 1). In this case, one can determine the control rate in one of four ways.

1. The control rate information $V^j(n)$ is determined only once every m measurement periods, i.e., a control signal is generated once every $T_p = mT_M$. In this case, we refer to $T_p$ as the update period. Note that in this case, the prediction of the cross traffic and the evolution of the queue are carried over (3m + 1) cycles. The computational over-head for each control signal is O(3m). However, only a single rate $V^j(n)$ is established for each update period.

2. Alternatively, for every update update period, one can determine a rate vector with m elements, one for each of the m sub-intervals. This control vector is generated once every $T_p$, but the upstream node modifies its rate at the beginning of each sub-interval. For this method, the computational cost for each update interval is $O(3m^2)$.

3. One can also send a control signal at the end of each measurement. This would result in m control signals every $T_p$. While the computational cost is $O(3m^2)$, the communication cost is m times the first method.

4. Finally, one can reduce the measurement and computational overhead by making fewer measurements, say once every $T_M = mT_p (m > = 1)$. We call this method the aggregation method.

Numerical results show that the first method is more than adequate. The method has low computational and communication overheads. While method 2 and 3 have significant computational and communication cost, they do not typically result in any significant improvement in performance. Choice of an appropriate measurement interval is also discussed.

In the model under consideration we have assumed a single controlled flow of data traffic in a tandem network. When there are multiple flows of controlled traffic, such as multiple virtual paths sharing the capacity of a common virtual pipe, each downstream node treats the multiple flows like a single composite flow and informs the upstream node of the maximum rate for the composite stream. The upstream node can now allocate the transmission capacity to the different flows on a first come first serve basis, or it can allocate based on the backlog of cells at that node due to each stream. When there are multiple upstream nodes, in the absence of any knowledge of the number of VPs carrying data traffic traversing through a node, (i.e., the node assumes that there is only a single VP or controlled flow), the downstream node determines the rate V for the controlled traffic and informs all upstream nodes contributing to the controlled traffic. In this case, the combined arrival rate at the node in question can be MV, where M is the total number of upstream nodes. This will lead to large loss, as well as oscillations in the network. Alternatively, the down stream node can ask each of the M upstream nodes to limit the maximum rate of their controlled traffic to V/M until the next update. While this will prevent overloads it may prove to be inefficient. For example, if some upstream nodes have a backlog of controlled traffic, while others do not, then the transmission capacity of upstream nodes with backlog may be unnecessarily wasted (by limiting their controlled traffic rate to V/M). A way to overcome this problem is for nodes to exchange frequently, information about their backlog, as is characteristic of the preferred embodiment of the invention.

Let nodes 1, ..., M be the immediate upstream nodes of node M + 1. Node i(i = 1,2, ..., M) informs node M + 1 of its backlog of controlled traffic $W^i$ and the rate $I^i$ at which it has been receiving controlled traffic from its immediate upstream nodes, as well as the available transmission capacity $(C^i - D^i)$ for controlled traffic on the link connecting node i and node M + 1, where $C^i$ is the transmission capacity of the link connecting node i and node M + 1, and $D^i$ is the capacity consumed by the cross traffic on this link. Note that the controlled traffic we are referring to at node i, is the controlled traffic component that will be routed from node i to node M + 1. Based on this information, node M + 1 allocates a rate $P_iV$ to node i, where $$P_i = \frac{\min\{C^i - D^i, W^i + I^i\}}{\sum_{j=1}^{M} \min\{C^j - D^j, W^j + I^j\}}.$$

For notational convenience, we have dropped the index n in the above equation. Here we assume that the transmission rate that is allocated to the controlled traffic flow must be the minimum of the available capacity $(C^i - D^i)$ for controlled traffic, and the controlled traffic backlog $(W^i + I^i)$, which is the maximum rate at which node i will be able to transmit its backlog of controlled traffic if node M + 1 does not place any constraint on it. Such a two way exchange of state information can significantly improve the efficiency of the control, especially when the loading is asymmetric.

Figure 2:
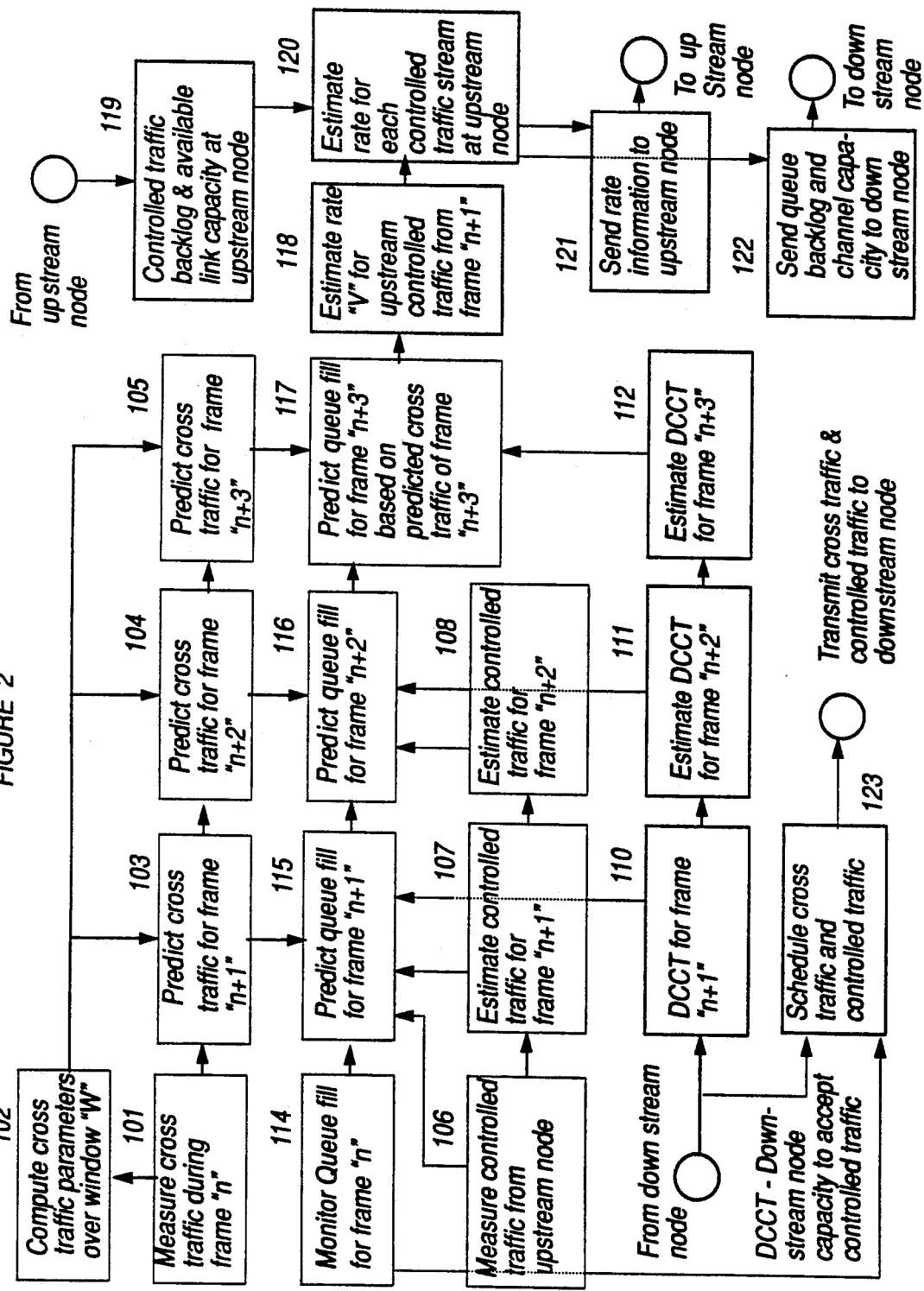
FIG. 2 is a chart showing the basic steps of the control process in accordance with the invention.

FIG. 2 illustrates the basic steps of the control process carried out at each node to motivate and control congestion in accordance with the preferred mode of the present invention, as discussed above with mathematical detail.

The process will be described now with reference to a particular node, termed the current node, each of the upstream nodes supplying the current node directly, termed the proximate upstream nodes, and each of the downstream nodes supplied directly by the current node, termed the proximate downstream nodes. The number of proximate upstream and downstream nodes may vary widely and be as few as one and as many as tens.

First, there is continuous measurement, indicated as step 101, at the current node, as well as each other node, of the cross traffic passing through such node in each time frame, which is chosen essentially to approximate the average propagation delay between two successive nodes along the transmission path. Additionally, as indicated by step 102, at each node, there are computed continuously the average cross traffic loads over a window W spanning several time frames. These parameters are used to predict, advantageously by a first order autoregressive function, the cross traffic that will need to be handled at the instant node at time frames $(n+1)$, $(n+2)$, where n is the instant time frame, indicated by steps 103, 104 and 105.

As indicated by step 106, there is also being measured continuously at the current node the controlled traffic arriving from each proximate upstream node, and from this there is also estimated the total controlled traffic that can be expected to be available in frames $(n+1)$ and $(n+2)$, as indicated in steps 107 and 108.

Additionally, as indicated at step 110, there is received continuously from each of the proximate downstream nodes information relating to its capacity to accept traffic from the current node in the next time frame $(n+1)$ as well as to estimate its capacity to accept such traffic in time frames $(n+2)$ and $(n+3)$, as indicated in steps 111 and 112.

As indicated by step 114, there is continuously being monitored the degree of fill of controlled traffic in the buffer associated with the current node. This fill constitutes the queue of the node. Based on the queue fill for frame n, and the estimates provided by steps 107 and 108 and the predictions of steps 103, 104, and 105, there is predicted the queue fill for frames $(n+1)$ $(n+2)$ and $(n+3)$ as indicated by steps 115, 116, and 117 based on the predicted cross and controlled traffics and the queue at the preceding time frame. Step 117 predicts only on the basis of the cross traffic expected at frame $(n+3)$ and the queue predicted for time frame $(n+2)$.

Based on the various estimated queue fills provided by steps 115, 116 and 117, as step 118, there is estimated the rate of controlled traffic that can be permitted to proceed from the upstream proximate nodes to the node in time frame $(n+2)$.

Additionally, as step 119, from the upstream node there is being supplied the backlogs in controlled traffic at each of the upstream proximate nodes and the available link capacity between such nodes and the current node. Based on this information and the total controlled traffic that can be supplied to the downstream proximate nodes available from step 118, as step 120 there is estimated the rate of controlled traffic that can be supplied from each upstream proximate node, and as step 121 this information is sent to the upstream proximate nodes so each can transmit appropriately.

There is also sent, as indicated by step 122, to the downstream proximate nodes its queue backlog and channel capacity information needed by each such node to control the traffic the current node will be allowed to send to the downstream node, in the manner that served to control the traffic the upstream proximate nodes were allowed to transmit to the current node. This essentially corresponds to the information sent to the instant node by its upstream proximate nodes for use in step 110. Information provided at step 114 as to the fill of controlled traffic and cross traffic in the buffer associated with the current node and information as to the capacity of the downstream nodes to accept controlled traffic are used to schedule the cross and controlled traffic to transmit to the downstream nodes.

Figure 3:
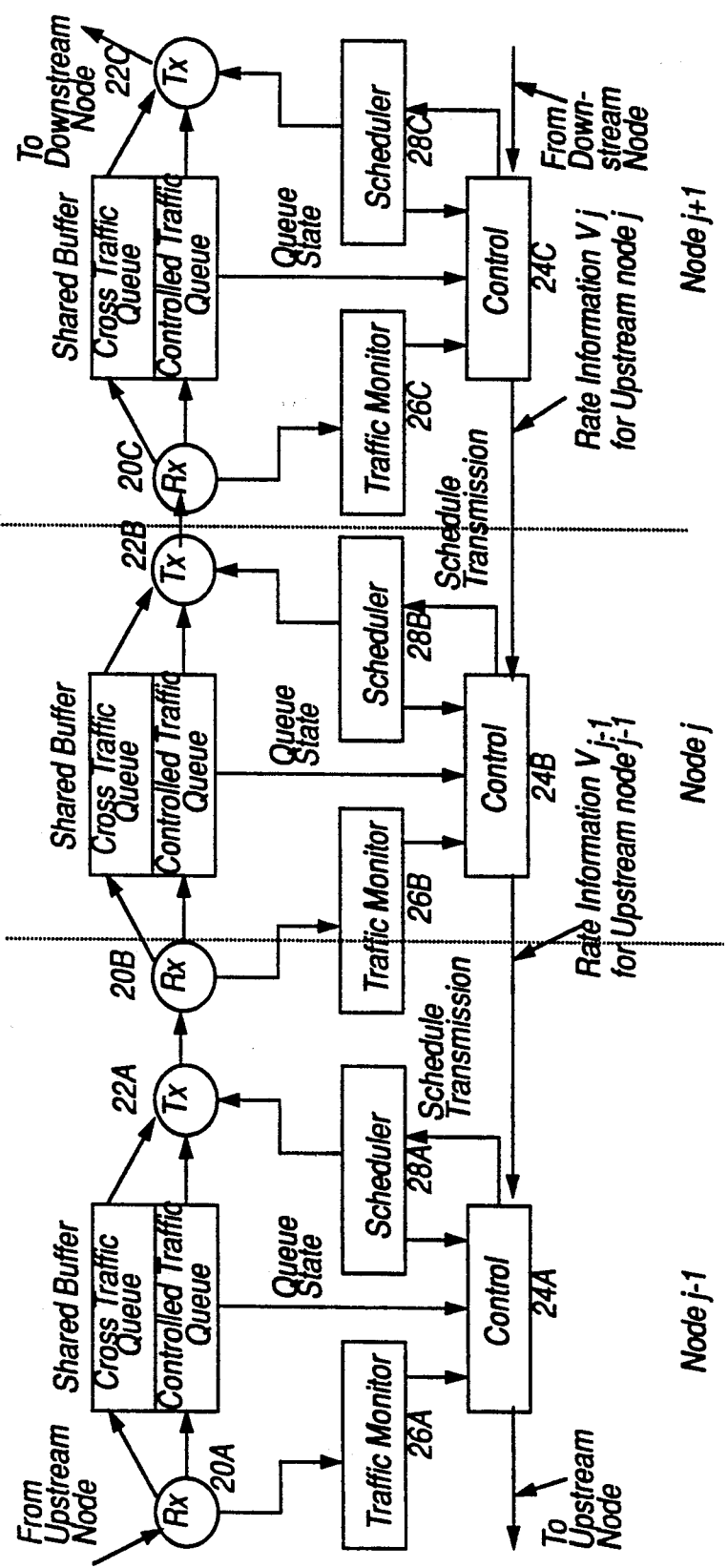
FIG. 3 shows a model of a network that includes provisions for congestion control in accordance with the invention.

FIG. 3 illustrates in schematic form three tandem nodes in a transmission path using congestion control in accordance with the invention.

The three nodes are, node $j-1$, the upstream node, node j, the current node, and node $j+1$, the downstream node.

Each node includes a receiver 20A, 20B, and 20C labeled Rx that receives the signal information coming into the node from the upstream proximate nodes, and a transmitter 22A, 22B, and 22C, labeled Tx that transmits signal information to its downstream proximate nodes. In the interest of simplicity, only a single continuous path has been shown, although at each receiver plural inputs, and at each transmitter plural outputs, typically will be involved. Moreover, at each input, the traffic will include both cross traffic and controlled traffic which will be separated therein for individual treatment, the cross traffic being passed through without delay, the controlled traffic typically passing into a buffer to be controllably measured. The metering is controlled by the controls 24A, 24B, and 24C at each node. As previously discussed, this control is supplied with information provided by the traffic monitors 26A, 26B, and 26C, which monitor the traffic that has come into its associated transmitter, information supplied by the control of each of its downstream proximate nodes, and information as to amount of controlled traffic in its queue. Each control in turn provides control information to schedulers 28A, 28B and 28C, which schedule the amount of controlled traffic to be passed from the queue into the associated transmitter. Each control additionally passes information into the control of each of its proximate upstream nodes needed by such node for its role.

It is to be appreciated that this processing is essentially done instantaneously at each node by a properly programmed computer. Moreover, extensive numerical calculations on the expected performance of the hop-by-hop system described indicates that its expected performance compares favorably with the expected performance of alternative possible control systems, as discussed below.

1. In comparison to both the static rate control policy (where the available capacity is known a priori from the call admission control) and the end-to-end based rate control policy, the predictive control policy performs significantly better in all cases that we have considered. For a given end-to-end cell loss rate for the controlled traffic, the predictive control policy is able to achieve higher network throughput. The actual improvement depends on the nature of the cross traffic. In the examples that we have investigated, the improvement in network throughput has ranged from 8% to 116%, and the improvement in controlled traffic throughput has ranged from 20% to 1200%.

2. The cross traffic characteristics have a significant impact on the network performance. In particular, the performance degrades for larger variances and large correlation in the cross traffic arrival rate. However, the relative improvement in performance of the predictive policy when compared to the static rate control policy is more for higher values of the correlation coefficient and the squared coefficient of variation. This is particularly important as the high priority cross traffic, such as video, is likely to have correlations. In order to achieve low loss and high network throughput, the cross traffic load must be limited when the variance of its arrival rate is high.

3. Like all reactive control mechanisms, the effectiveness of the predictive control policy diminishes with increasing link speed and propagation delay. The actual degradation in performance depends on how the cross traffic load is scaled up with increase in link speeds (in order to keep the utilization constant). The degradation is much less when the cross traffic is due to the superposition of many low intensity streams. The efficiency of the predictive control policy at higher link speeds can however be improved by providing more buffers at each node. In the case of large propagation delay between adjacent nodes, we propose that the links be segmented and connected through pseudo-nodes. The effect of introducing the pseudo-nodes is to make it appear as though the two nodes are closer than they really are.

4. In the case of multiple data streams (which share a common virtual pipe at the downstream node), oscillations can result which leads to higher cell loss. If the upstream nodes inform the downstream node of their backlog of controlled traffic cells and the transmission capacity to transmit them, wastage of network resources and cell loss rate can be reduced.

5. A drawback with all feedback control policies is that sources that are near to the common feedback point receive preferential treatment. This favorable bias to the nearby sources can be eliminated by making the distant sources appear closer through the introduction of pseudo-nodes.

What is claimed is:

1. A process for the control of traffic for reducing congestion on a transmission path that includes a plurality of nodes between an upstream source of the traffic and a downstream destination for the traffic comprising the steps at a given node of:

predicting, on the basis of recently measured cross traffic, the amounts of cross traffic that it will receive over each of the next three time frames;

estimating, on the basis of measured controlled traffic being received from each upstream node to which it is directly connected, the amounts of controlled traffic that will be available to it over the next two time frames;

based on (1) the said previously predicted amounts of cross traffic it will be receiving over the next three time frames, (2) said previously estimated amounts of controlled traffic that will be available to it from said upstream nodes over the next two time frames, (3) the estimated capacity to accept controlled traffic from it of the downstream nodes directly connected to it, and (4) the present state of its queue, predicting the amounts of traffic that will keep its queue at a desired level over the next three time frames;

based on the predictions of said last recited step, estimating the total amount of traffic it should accept from said upstream nodes two time frames later;

based on the estimates of the last step, the controlled traffic backlog at each of said upstream nodes and the available link capacity of each, scheduling the rate of controlled traffic it is willing to accept from each of said upstream nodes;

forwarding the information as to the scheduled rates to each of said upstream nodes;

receiving from each of the downstream nodes directly connected to it the information as to the scheduled rate of controlled traffic it can send to each of said downstream nodes; and transmitting its cross traffic and controlled traffic to each of said downstream nodes in accordance with the information received from each of the said downstream nodes.

2. The process of claim 1 in which the prediction of the amount of cross traffic that the given node will receive over the next three time frames uses the average of the cross traffic over a window of several time frames.

3. The process of claim 2 in which the traffic is in the form of signal packets and the cross traffic is primarily voice and video traffic and the controlled traffic is primarily data traffic.

4. The process of claim 3 in which the time frame approximates the average time it takes the traffic to travel between adjacent nodes of the transmission path.

5. In a packet switching transmission system including a plurality of nodes that are separated an average propagation delay time and where traffic may be added or subtracted from the path, a process for hop-by-hop congestion control that comprises at each node the steps of predicting the queue size at said node three propagation delay times in advance, estimating the amount of traffic it can accept from its proximate upstream nodes two propagation delay times in advance based on such prediction, based on these estimates and predictions, transmitting to its proximate upstream nodes the amount of traffic it can accept for controlling the rate at which each transmits traffic to it, receiving from its proximate downstream nodes the traffic they are willing to accept from it, and transmitting to its proximate downstream nodes the amount of traffic each can accept from it.

6. A packet switching transmission network that includes a plurality of nodes separated by an average delay time and interconnected to provide hop-by-hop transmission flow between sources and destinations characterized in that hop-by-hop control of the flow is provided at each node by control means comprising means for predicting the queue size at said node three delay times in advance and for estimating the maximum amount of traffic it can accordingly accept from its proximate upstream nodes two delay times in advance, means for transmitting these estimates of amount of traffic it can expect to each of its proximate upstream nodes, means for receiving from its proximate downstream nodes similar information as to the amount of traffic that each will accept from it, and means for scheduling and transmitting to each of its downstream nodes traffic in accordance with the information received of the amount of traffic each can accept.

* * * * *